(12) United States Patent
Miao et al.

(10) Patent No.: US 9,213,155 B2
(45) Date of Patent: Dec. 15, 2015

(54) LIGHT STEERING FOR SILICON PHOTONIC DEVICES

(71) Applicant: Futurewei Technologies, Inc., Plano, TX (US)

(72) Inventors: Rongsheng Miao, San Jose, CA (US); Yu Sheng Bai, Los Altos Hills, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/581,582

(22) Filed: Dec. 23, 2014

(65) Prior Publication Data

US 2015/0185426 A1 Jul. 2, 2015

Related U.S. Application Data (60) Provisional application No. 61/920,906, filed on Dec. 26, 2013.

(51) Int. Cl.
*G02B 6/42* (2006.01)
*G02B 6/32* (2006.01)
*G02B 6/34* (2006.01)
*G02F 1/09* (2006.01)

(52) U.S. Cl.
CPC ............... *G02B 6/4214* (2013.01); *G02B 6/32* (2013.01); *G02B 6/34* (2013.01); *G02B 6/424* (2013.01); *G02B 6/4239* (2013.01); *G02B 6/4244* (2013.01); *G02B 6/4245* (2013.01); *G02F 1/093* (2013.01)

(58) Field of Classification Search
CPC .... G02B 6/42142; G02B 6/4244; G02B 6/32; G02B 6/4245; G02B 6/34; G02B 6/424; G02B 6/4239; G02F 1/093

USPC ............................................. 385/4–16, 31–37
See application file for complete search history.

(56) References Cited

U.S. PATENT DOCUMENTS 5,689,360 A * 11/1997 Kurata et al. .................. 359/281
7,505,192 B1 * 3/2009 Zhao et al. ..................... 359/282

(Continued)

FOREIGN PATENT DOCUMENTS

| CN | 1599157 A | 3/2005 |
| CN | 1758081 A | 4/2006 |
| GB | 2387479 A | 10/2003 |
| JP | 2013012548 A | 1/2013 |

OTHER PUBLICATIONS

Partial English Translation and Abstract of Japanese Application No. JP2013012548A, May 15, 2015, 23 pages.

(Continued)

*Primary Examiner* — Akm Enayet Ullah
(74) *Attorney, Agent, or Firm* — Conley Rose, P.C.; Grant Rodolph; Adam J. Stegge (57) ABSTRACT

A photonic device comprising a base plate, a photonic laser coupled to the base plate, wherein the photonic laser is configured to generate a light, a lens coupled to the base plate, wherein the lens is configured to receive the light from the photonic laser, form a focused light, and pass the focused light to a reflector, and the reflector incorporated with the base plate such that the lens is positioned between the photonic laser and the reflector, wherein the reflector is configured to receive the focused light, and wherein the reflector is configured to steer a first portion of the focused light through the base plate using total internal reflection.

9 Claims, 7 Drawing Sheets

(56) References Cited

U.S. PATENT DOCUMENTS

| | | |
|---|---|---|
| 8,168,939 B2 | 5/2012 | Mack et al. |
| 8,379,495 B2 * | 2/2013 | Boone et al. ............... 369/13.24 |
| 2005/0023489 A1 * | 2/2005 | Kikuchi ........................ 250/551 |
| 2005/0063642 A1 | 3/2005 | Gallup et al. |
| 2006/0078262 A1 | 4/2006 | Chen et al. |
| 2006/0239612 A1 | 10/2006 | De et al. |
| 2012/0251033 A1 | 10/2012 | Matsuoka et al. |

OTHER PUBLICATIONS

Foreign Communication From A Counterpart Application, PCT Application No. PCT/CN2014/094986, International Search Report dated Mar. 25, 2015, 5 pages.

Foreign Communication From A Counterpart Application, PCT Application No. PCT/CN2014/094986, Written Opinion dated Mar. 25, 2015, 7 pages.

* cited by examiner

LIGHT STEERING FOR SILICON PHOTONIC DEVICES

CROSS-REFERENCE TO RELATED APPLICATIONS

The present application claims benefit of U.S. Provisional Patent Application No. 61/920,906 filed Dec. 26, 2013 by Rongsheng Miao, et al. and entitled "Silicon Laser Mount," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Silicon photonic devices are devices that use silicon as an optical medium in a chip. Silicon photonic devices can operate in the infrared wavelength region, which is typically used in fiber optic telecommunications systems. Silicon photonic devices are made using existing semiconductor fabrication techniques. For example, silicon can be deposited onto a layer of silica to create silicon-on-insulator (SOI) devices. Silicon is also typically used as the substrate for electrical integrated circuits. As such, a hybrid silicon device can be fabricated that comprises both optical components and electronic components that are integrated onto a single chip. A hybrid silicon device allows electrical data operations and provides optical interconnects that allow for faster data transfer between or within chips.

Silicon photonic devices use photonic laser sources as optical signal sources (e.g., light sources). Typically, photonic laser sources cannot be monolithically integrated into a silicon chip, so an external photonic laser is needed. Surface grating is commonly used in a silicon chip to input light from a photonic laser. The grating coupling light is in an incident angle in a nearly vertical orientation to the surface of the silicon chip. Some applications require using silicon photonic devices in non-hermetic packaging, however, packaging silicon photonic devices to work with grating couplers using non-hermetic packaging can be challenging. Some existing silicon photonic devices use light sources that are mounted horizontally along the surface of the silicon chip. These silicon photonic devices comprise a lid that is coated in a metallic material coating (e.g., gold plating). Light is reflected off of an interior surface of the lid to redirect the light into the silicon chip. Testing these silicon photonic devices is difficult because the lid is required for operation and there is no way to access the enclosed components. As such, special tools are often required to test existing silicon photonic devices.

SUMMARY

In one embodiment, the disclosure includes a photonic device comprising a base plate, a photonic laser coupled to the base plate, wherein the photonic laser is configured to generate a light, a lens coupled to the base plate, wherein the lens is configured to receive the light from the photonic laser, form a focused light, and pass the focused light to a reflector, and the reflector incorporated with the base plate such that the lens is positioned between the photonic laser and the reflector, wherein the reflector is configured to receive the focused light, and wherein the reflector is configured to steer a first portion of the focused light through the base plate using total internal reflection.

In another embodiment, the disclosure includes a method comprising providing a base plate that comprises a reflector, wherein the reflector is configured to reflect a focused light using total internal reflection, coupling a photonic laser to the base plate, wherein the photonic laser is configured to generate a light, and coupling a lens to the base plate, wherein the lens is positioned between the photonic laser and the reflector, and wherein the lens is configured to receive the light and to generate the focused light.

In yet another embodiment, the disclosure includes a light steering method comprising activating a photonic laser to transmit a light, focusing the light using a lens, and steering a first portion of the light through a base plate and towards a grating port using total internal reflection within a reflector.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for a silicon photonic device that is configured to generate light signals using a photonic laser and to steer the light towards a grating port or a waveguide on a silicon chip. The term "light" may refer to a laser light, a laser beam, or any other suitable optical signal. Light is reflected or steered using total internal reflection from the crystalline silicon structure of a reflector that is incorporated with a base plate. Using total internal reflection, about all of the light is reflected off of a surface and about none of the light passes through the surface. In another embodiment, a lid is provided to encapsulate silicon photonic device components (e.g., a photonic laser, a reflector, and a lens) and to provide a hermetic seal for silicon photonic device components. An optional lid allows a silicon photonic device to be used both hermetically sealed and non-hermetically sealed applications. By not requiring a lid for operation, the silicon photonic device can be manufactured and tested at a wafer level. Furthermore, omitting the optional lid can lower costs in hermetical applications by reducing the number of components (e.g., the lid) and the amount of processing (e.g., alloy sealing) required.

Figure 1:
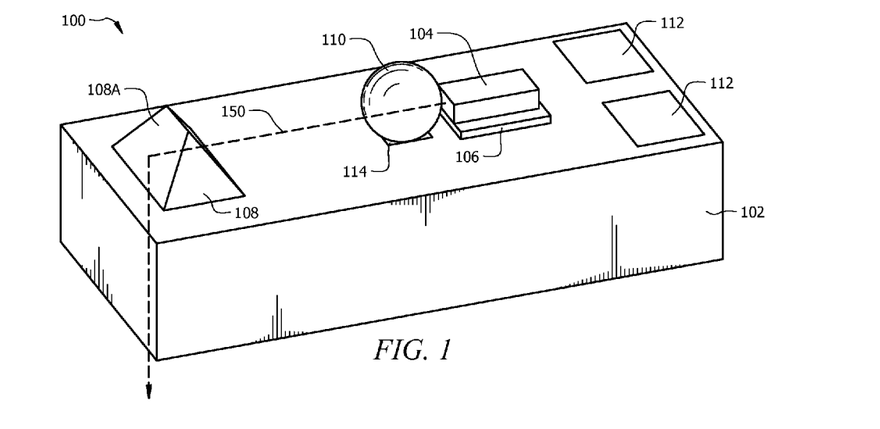
FIG. 1 is a perspective view of an embodiment of a silicon photonic device.

FIG. 1 is a perspective view of an embodiment of a silicon photonic device 100. Silicon photonic device 100 comprises a base plate 102, a photonic laser 104, a laser mount 106, a reflector 108, a lens 110, and bonding pads 112. The components may be arranged as shown or in any other suitable manner.

Base plate 102 is formed using a silicon substrate which can be fabricated using wet etching or dry etching. Photonic laser 104 is configured to generate a light 150 and to transmit the light 150 substantially parallel with the surface of base plate 102. Photonic laser 104 comprises a laser, for example, a silicon photonic laser, an edge emitting laser, or any other suitable light source as would be appreciated by one of ordinary skill in the art upon viewing this disclosure. In an embodiment, laser mount 106 couples photonic laser 104 to base plate 102. Alternatively, photonic laser 104 is coupled to base plate 102 using any suitable technique, for example, an epoxy or a metal alloy.

Lens 110 is positioned between the photonic laser 104 and reflector 108. Lens 110 is coupled to base plate 102 such that a light 150 from photonic laser 104 passes through lens 110 to reflector 108. Lens 110 focuses a light 150 onto the grating port via reflector 108. Lens 110 may include, but is not limited to, a ball lens. In an embodiment, a slot 114 is etched into the surface of base plate 102 to accommodate lens 110. Lens 110 may also be bonded to base plate 102, for example, using an ultraviolet (UV) adhesive.

Reflector 108 is monolithically formed onto the base plate 102, for instance, using a wet etching on the base plate 102 that starts on the silicon crystal plane with Miller indices of [100]. As such, reflector 108 and base plate 102 are formed from a single silicon substrate. Reflector 108 may include, but is not limited to, a wedge reflector. Reflector 108 is configured to reflect a light 150 from the photonic laser 104 using total internal reflection within the reflector 108 (e.g., off of a silicon crystal plane) to redirect or steer the light 150. For example, light 150 from the photonic laser 104 passes through lens 110, enters the reflector 108, and is steered towards a grating port on a silicon chip (not shown) through total internal reflection inside of the reflector 108. The light 150 may be steered in a downward direction (e.g., orthogonal to the surface of base plate 102) towards the grating port. The angle of total internal reflection within the reflector 108 is determined by the crystal lattice orientation (e.g., a silicon crystal plane) and silicon structure of the reflector 108. For instance, an angle of internal reflection may be determined by an angled internal surface 108A formed by the crystal lattice orientation of reflector 108. In an embodiment, the angled internal surface 108A may be from about 54.0 degrees to about 54.7 degrees from the surface of the base plate 102. Alternatively, the angled internal surface 108A of the reflector 108 may be any other suitable angle for internally reflecting light 150 through base plate 102 as would be appreciated by one of ordinary skill in the art upon viewing this disclosure.

Bonding pads 112 comprise one or more electrical contact pads integrated with base plate 102. Bonding pads 112 are formed using metals (e.g., gold or copper) or any other material capable of communicating electrical signals. Bonding pads 112 are electrically coupled to photonic laser 104 (e.g., via metal traces) and are configured to interface the photonic laser 104 with other components (e.g., a power source or a controller) (not shown). As such, bonding pads 112 are configured to provide electrical power or control signals from other components to photonic laser 104 to activate photonic laser 104.

Figure 2:
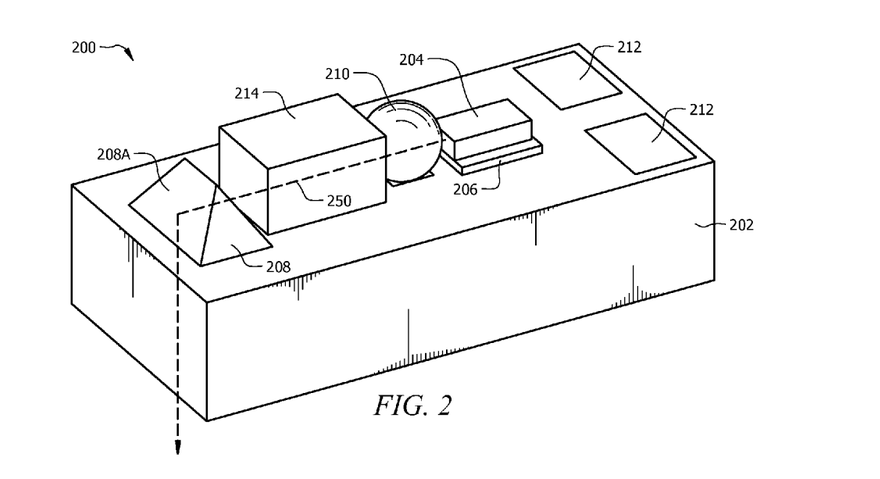
FIG. 2 is a perspective view of another embodiment of a silicon photonic device.

FIG. 2 is a perspective view of another embodiment of a silicon photonic device 200. Silicon photonic device 200 comprises a base plate 202, a photonic laser 204, a laser mount 206, a reflector 208, a lens 210, bonding pads 212, and an optical isolator 214. The base plate 202, photonic laser 204, laser mount 206, reflector 208, lens 210, and bonding pads 212 may be arranged similarly to base plate 102, photonic laser 104, laser mount 106, reflector 108, lens 110, and bonding pads 112 described in FIG. 1, respectively, or in any other suitable manner. In an embodiment, base plate 202, photonic laser 204, laser mount 206, reflector 208, lens 210, and bonding pads 212 are configured similarly to base plate 102, photonic laser 104, laser mount 106, reflector 108, lens 110, and bonding pads 112 described in FIG. 1, respectively.

In FIG. 2, optical isolator 214 is positioned between lens 210 and reflector 208 such that a light 250 from photonic laser 204 passes through lens 210 and optical isolator 214 to reflector 208. Optical isolator 214 is configured to prevent light 250 from reflecting back into photonic laser 204. An optical isolator 214 may include, but is not limited to, a Faraday rotator or a complete rotator with a polarizer. Optical isolator 214 is coupled to base plate 202 using a slot that is etched into the base plate (not shown) and/or an epoxy (e.g., UV adhesive). The light 250 from photonic laser 204 internally reflects within reflector 208 off an angled internal surface 208A towards a grating port on a silicon chip (not shown).

Figure 3:
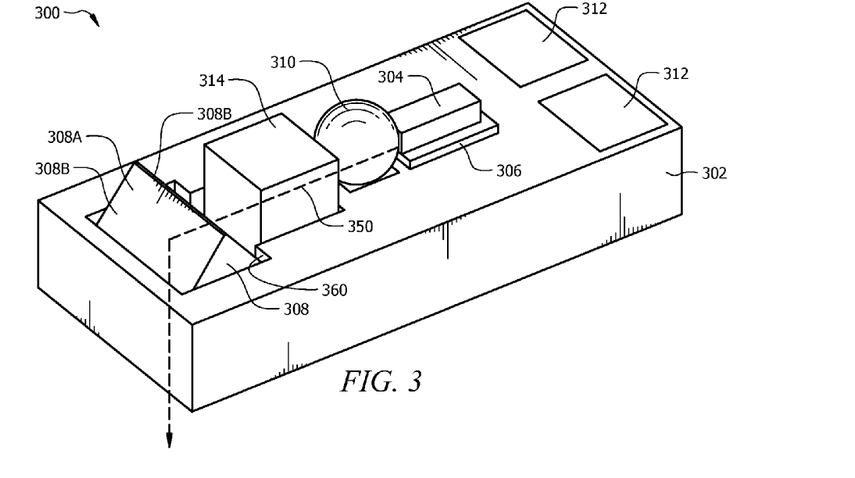
FIG. 3 is a perspective view of another embodiment of a silicon photonic device.

FIG. 3 is a perspective view of another embodiment of a silicon photonic device 300. Silicon photonic device 300 comprises a base plate 302, a photonic laser 304, a laser mount 306, a reflector 308, a lens, 310, bonding pads 314, and an optical isolator 314. The base plate 302, photonic laser 304, laser mount 306, lens, 310, bonding pads 312, and optical isolator 314 may be arranged similarly to base plate 202, photonic laser 204, laser mount 206, lens 210, bonding pads 212, and optical isolator 214 described in FIG. 2, respectively, or in any other suitable manner. In an embodiment, base plate 302, photonic laser 304, laser mount 306, lens 310, bonding pads 312, optical isolator 314 are configured similarly to base plate 202, photonic laser 204, laser mount 206, lens 210, bonding pads 212, and optical isolator 214 described in FIG. 2, respectively.

Unlike silicon photonic device 200 described in FIG. 2, reflector 308 is coupled to base plate 302 and is not monolithically formed onto the base plate 302. For instance, base plate 302 comprises a slot or cavity 360. Reflector 308 is positioned within cavity 360 and is coupled to base plate 302. For example, reflector 308 can be bonded to base plate 302 using epoxy bonding. The epoxy used to couple reflector 308 to base plate 302 is index matched to the base plate 302. Index matching an interface between different materials reduces light reflection as light passes through the interface between the different materials. Alternatively, reflector 308 can be bonded or coupled to base plate 302 using any other suitable technique as would be appreciated by one of ordinary skill in the art upon viewing this disclosure. Reflector 308 may include, but is not limited to, a prism or a silicon structure. An anti-reflective (AR) coating can be applied to one or more external surfaces of reflector 308 to reduce reflections to generate a semi-reflective surface. For example, an AR coating with a refractive index that is matched to the bonding epoxy is applied to an external surface of reflector 308 (not shown) where reflector 308 and base plate 302 are bonded. An AR coating with a refractive index matched to the air-to-silicon interface can be applied to external surfaces 308B of reflector 308.

Reflector 308 is configured to reflect a light 350 from the photonic laser 304 using total internal reflection within the reflector 308 (e.g., off of a silicon crystal plane) to redirect or steer the light 350. For example, light 350 from the photonic laser 304 enters the reflector 308 and is steered towards a grating port on a silicon chip (not shown) through total internal reflection inside of the reflector 308. The light 350 may be steered in a downward direction (e.g., orthogonal to the surface of base plate 302) towards the grating port. The angle of total internal reflection within the reflector 308 is determined by the crystal lattice orientation (e.g., a silicon crystal plane) and/or structure of the reflector 108. For instance, an angle of internal reflection may be determined by an angled internal surface 308A formed by the crystal lattice orientation of reflector 308. The angle of internal reflection may be configured or determined similarly to reflector 108 described in FIG. 1.

Figure 4:
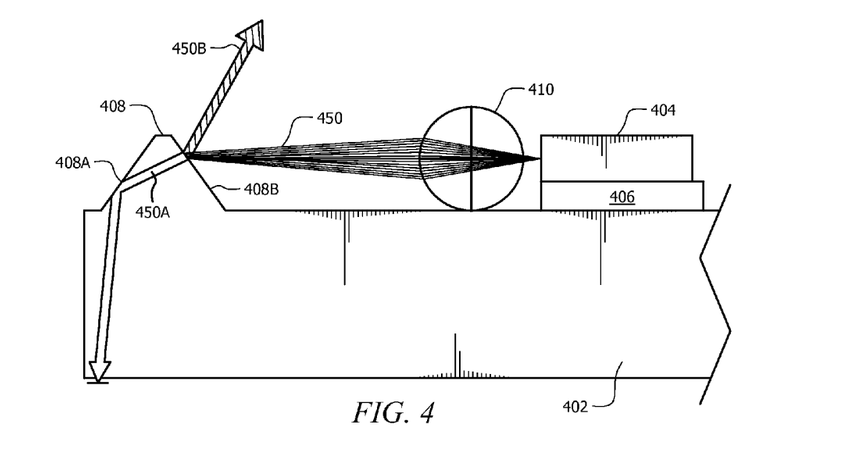
FIG. 4 is a side profile view of an embodiment of a silicon photonic device in operation.

FIG. 4 is a side profile view of an embodiment of a silicon photonic device 400. Silicon photonic device 400 comprises a base plate 402, a photonic laser 404, a laser mount 406, a reflector 408, and a lens 410. The base plate 402, photonic laser 404, laser mount 406, reflector 408, and lens 410 may be arranged similarly to base plate 102, photonic laser 104, laser mount 106, reflector 108, lens 110, and bonding pads 112 described in FIG. 1, respectively, or in any other suitable manner. In an embodiment, base plate 402, photonic laser 404, laser mount 406, reflector 408, and lens 410 are configured similarly to base plate 102, photonic laser 104, laser mount 106, reflector 108, and lens 110 described in FIG. 1, respectively. In an embodiment, silicon photonic device 400 may further comprise an optical isolator (not shown) similar to optical isolator 214 described in FIG. 2.

An AR coating can be applied to one or more external surfaces of reflector 408. For example, an AR coating is applied to a front external surface 408B. AR coating reduces the amount of light loss due to reflection. AR coatings include, but are not limited to, silicon nitride. As an example, AR coating is applied to the front external surface 408B such that about 80 percent to about 90 percent of light 450 enters reflector 408. Any suitable AR coating material or concentration of AR coating can be applied to the front external surface 408B to control the amount of light 450 that enters reflector 408 as would be appreciated by one of ordinary skill in the art upon viewing this disclosure. When photonic laser 404 is activated, light 450 is generated and transmitted to lens 410. Lens 410 focuses light 450 and passes light 450 to reflector 408. A first portion of light 450 (shown as light 450A) enters reflector 408 through the front external surface 408B and is reflected internally via total internal reflection off of an angled internal surface 408A through base plate 402 towards a grating port (not shown). A second portion of light 450 (shown as light 450B) is reflected off of the front external surface 408B of reflector 408 and away from base plate 402. Light 450B may be detected or monitored by other devices, for example, for testing purposes.

Figure 5:
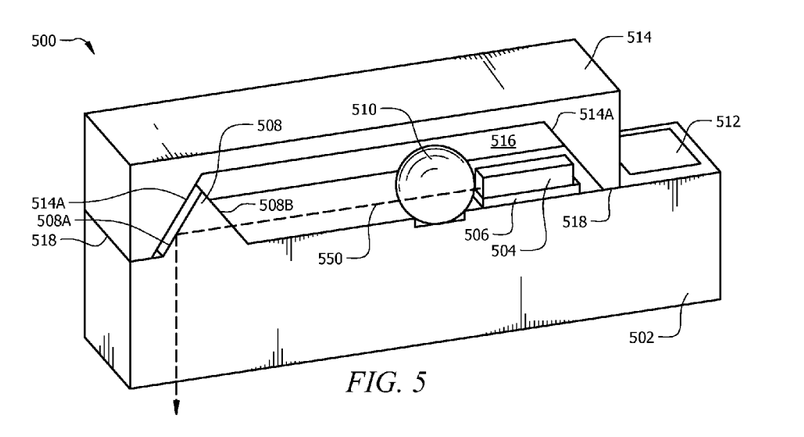
FIG. 5 is a cutaway perspective view of an embodiment of a silicon photonic device with a lid.

FIG. 5 is a cutaway perspective view of an embodiment of a silicon photonic device 500 with a lid 514. Silicon photonic device 500 comprises a base plate 502, a photonic laser 504, a laser mount 506, a reflector 508, a lens 510, and bonding pads 512. In an embodiment, base plate 502, photonic laser 504, laser mount 506, reflector 508, lens 510, and bonding pads 512 are configured similarly to base plate 102, photonic laser 104, laser mount 106, reflector 108, lens 110, and bonding pads 112 described in FIG. 1, respectively. The base plate 502, photonic laser 504, laser mount 506, reflector 508, lens 510, and bonding pads 512 may be arranged similarly to base plate 102, photonic laser 104, laser mount 106, reflector 108, lens 110, and bonding pads 112 described in FIG. 1, respectively, or in any other suitable manner. In an embodiment, silicon photonic device 500 may further comprise an optical isolator (not shown) similar to optical isolator 214 described in FIG. 2.

Unlike silicon photonic device 100 in FIG. 1, silicon photonic device 500 in FIG. 5 further comprises a lid 514. Lid 514 is formed using silicon or glass (e.g., fused silica). A lid cavity 516 is fabricated into lid 514 using wet etching. Lid 514 is configured such that the lid cavity 516 is formed with a plurality of angled interior surfaces 514A. The angled interior surfaces 514A are not covered in a reflective material coating or metallic plating and substantially do not reflect a light 550. Lid 514 is bonded to base plate 502 such that the lid cavity 516 encapsulates photonic laser 504, laser mount 506, reflector 508, and lens 510. Lid 514 is hermetically sealed to base plate 502. For example, lid 514 can be hermetically sealed using metal alloy bonding or glass fit bonding along an interface 518 between lid 514 and base plate 502 depending on temperature requirements for a given application. A hermetic seal substantially disallows air to enter or exit the lid cavity 516. For instance, a hermetic seal may have a hermeticity of about $10^{-7}$ or about $10^{-8}$ atmosphere cubic centimeters per second $(atm.cc.s^{-1})$. In an alternative embodiment, lid 514 may form a lid cavity 516 and hermetic seal using any suitable topology or technique as would be appreciated by one of ordinary skill in the art upon viewing this disclosure.

When photonic laser 504 is activated, light 550 is generated and transmitted to lens 510. Lens 510 focuses light 550 and passes light 550 to reflector 508. At least a portion of light 550 enters reflector 508 through the front external surface 508B and is reflected internally via total internal reflection off of an angled internal surface 508A through base plate 502 towards a grating port (not shown). As such, silicon photonic device 500 does not reflect light 550 off of the angled interior surfaces 514A of lid 514 to redirect or steer light 550 towards the grating port.

Figure 6:
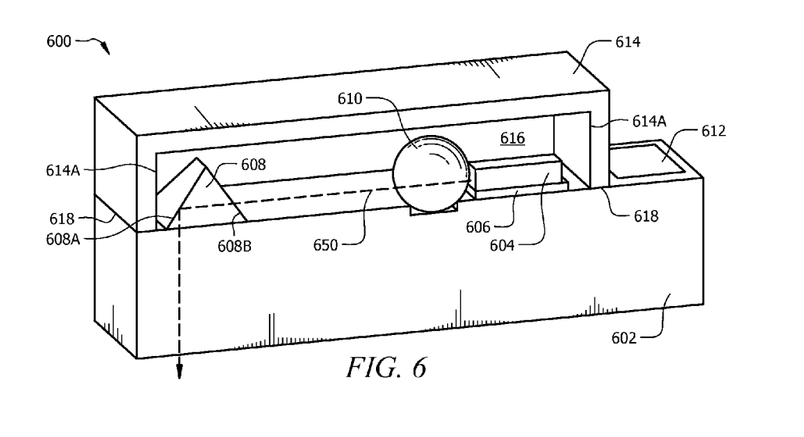
FIG. 6 is a cutaway perspective view of another embodiment of a silicon photonic device with a lid.

FIG. 6 is a cutaway perspective view of another embodiment of a silicon photonic device 600 with a lid 614. Silicon photonic device 600 comprises a base plate 602, a photonic laser 604, a laser mount 606, a reflector 608, a lens 610, bonding pads 612, and lid 614. In an embodiment, base plate 602, photonic laser 604, laser mount 606, reflector 608, lens 610, and bonding pads 612 are configured similarly to base plate 102, photonic laser 104, laser mount 106, reflector 108, lens 110, and bonding pads 112 described in FIG. 1, respectively. The base plate 602, photonic laser 604, laser mount 606, reflector 608, lens 610, and bonding pads 612 may be arranged similarly to base plate 102, photonic laser 104, laser mount 106, reflector 108, lens 110, and bonding pads 112 described in FIG. 1, respectively, or in any other suitable manner. In an embodiment, silicon photonic device 600 may further comprise an optical isolator (not shown) similar to optical isolator 214 described in FIG. 2.

Unlike silicon photonic device 100 in FIG. 1, silicon photonic device 600 in FIG. 6 further comprises a lid 614. Lid 614 is formed using silicon or glass (e.g., fused silica). In contrast to lid cavity 516 in FIG. 5 which is fabricated using wet etching, a lid cavity 616 is fabricated into lid 614 using dry etching. Lid 614 is configured such that the lid cavity 616 is formed with a plurality of substantially vertical interior surfaces 614A. The vertical interior surfaces 614A are not covered in a reflective material coating or metallic plating and substantially do not reflect light 650. Lid 614 is bonded to base plate 602 such that the lid cavity 616 encapsulates photonic laser 604, laser mount 606, reflector 608, and lens 610. Lid 614 is hermetically sealed to base plate 602. For example, lid 614 can be hermetically sealed using metal alloy bonding or glass fit bonding along an interface 618 between lid 614 and base plate 602 depending on temperature requirements for a given application. In an alternative embodiment, lid 614 may form a lid cavity 616 and hermetic seal using any suitable topology or technique as would be appreciated by one of ordinary skill in the art upon viewing this disclosure.

When photonic laser 604 is activated, light 650 is generated and transmitted to lens 610. Lens 610 focuses light 650 and passes light 650 to reflector 608. At least a portion of light 650 enters reflector 608 through the front external surface 608B and is reflected internally via total internal reflection off of an angled internal surface 608A through base plate 602 towards a grating port (not shown). As such, silicon photonic device 600 does not reflect light 650 off of the vertical interior surfaces 614A to redirect or steer light 650 towards the grating port.

Figure 7:
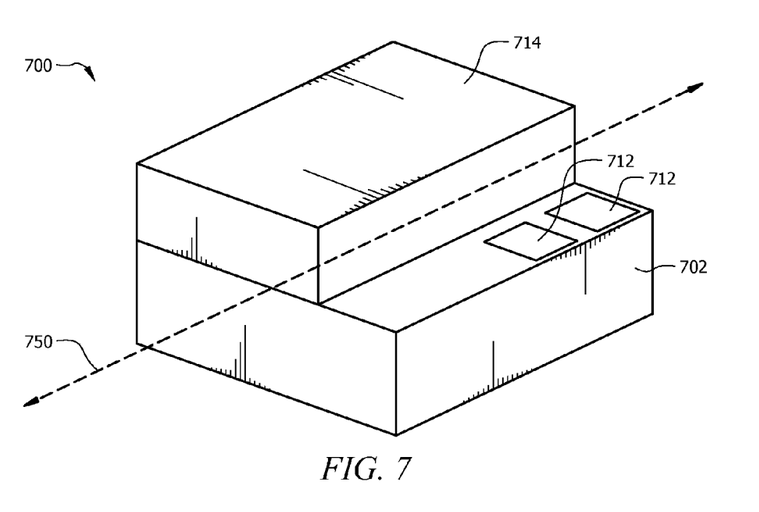
FIG. 7 is a perspective view of an embodiment of a silicon photonic device with a lid.

FIG. 7 is a perspective view of an embodiment of a silicon photonic device 700 with a lid 714. Silicon photonic device 700 may be configured similarly to silicon photonic device 500 described in FIG. 5 or silicon photonic device 600 described in FIG. 6. Silicon photonic device 700 comprises bonding pads 712 which may be configured similarly to bonding pads 112 described in FIG. 1.

Bonding pads 712 can be positioned or configured in any suitable position along the base plate 702 as would be appreciated by one of ordinary skill in the art upon viewing this disclosure. For example, one or more bonding pads 712 may be positioned in parallel with lid 714 along a longitudinal axis 750. Alternatively, one or more bonding pads 712 may be positioned in line with lid 714 long the longitudinal axis 750. Bonding pads 712 can be positioned proximately to each other or separately from each other (e.g., on opposite or adjacent sides of lid 714).

Figure 8:
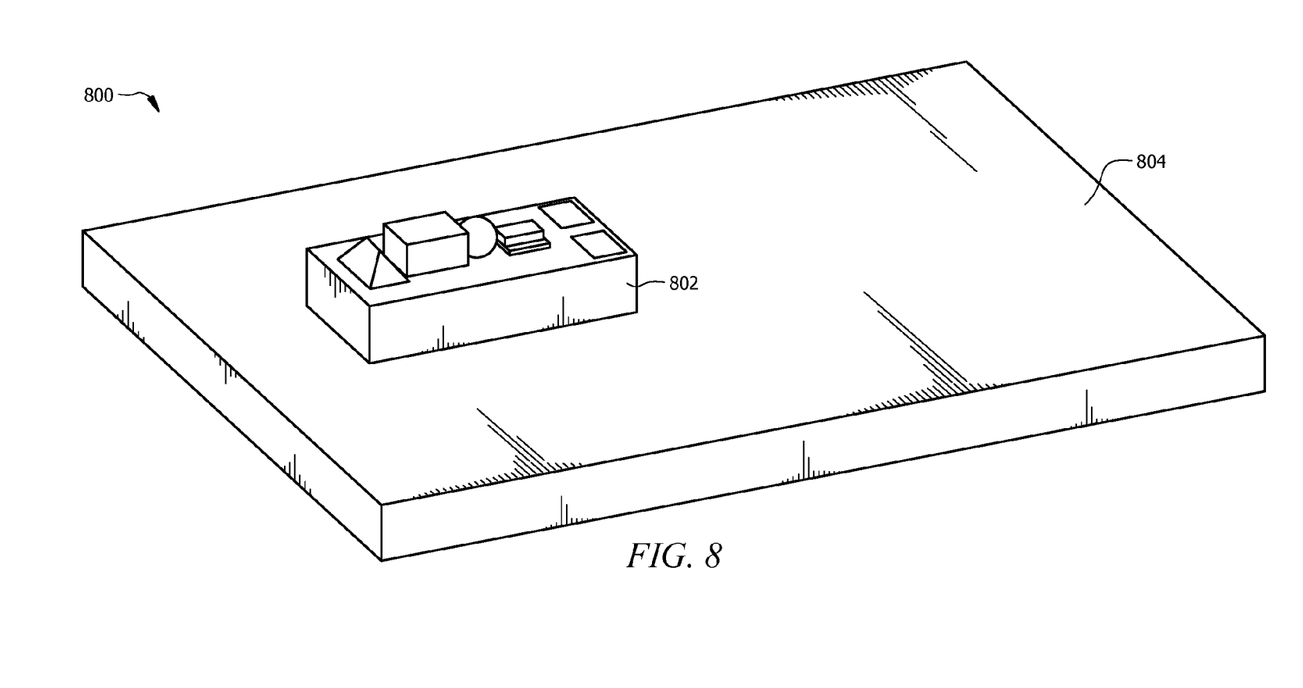
FIG. 8 is a perspective view of an embodiment of an optical system that comprises a silicon photonic device integrated with a silicon chip.

FIG. 8 is a perspective view of an embodiment of an optical system 800 that comprises a silicon photonic device 802 integrated with a silicon chip 804. Optical system 800 can be employed for applications that do not require a lid (e.g., lid 514 described in FIG. 5 or lid 614 described in FIG. 6) for the silicon photonic device 802, for example, when the silicon photonic device 802 is located within a hermetic package. Silicon photonic device 802 may be configured similarly to silicon photonic device 100 described in FIG. 1 or silicon photonic device 200 described in FIG. 2.

Silicon chip 804 is a silicon substrate that comprises one or more grating ports or waveguides. Silicon photonic device 802 is bonded to silicon chip 804 using an epoxy or any other suitable bonding technique as would be appreciated by one of ordinary skill in the art upon viewing this disclosure. Silicon photonic device 802 is aligned with silicon chip 804 such that at least a portion of light can be communicated from the silicon photonic device 802 to one or more grating ports or waveguides on silicon chip 804. In an embodiment, another portion of the light may be communicated for detection or monitoring in a manner similar to those described in FIG. 4 for testing.

Figure 9:
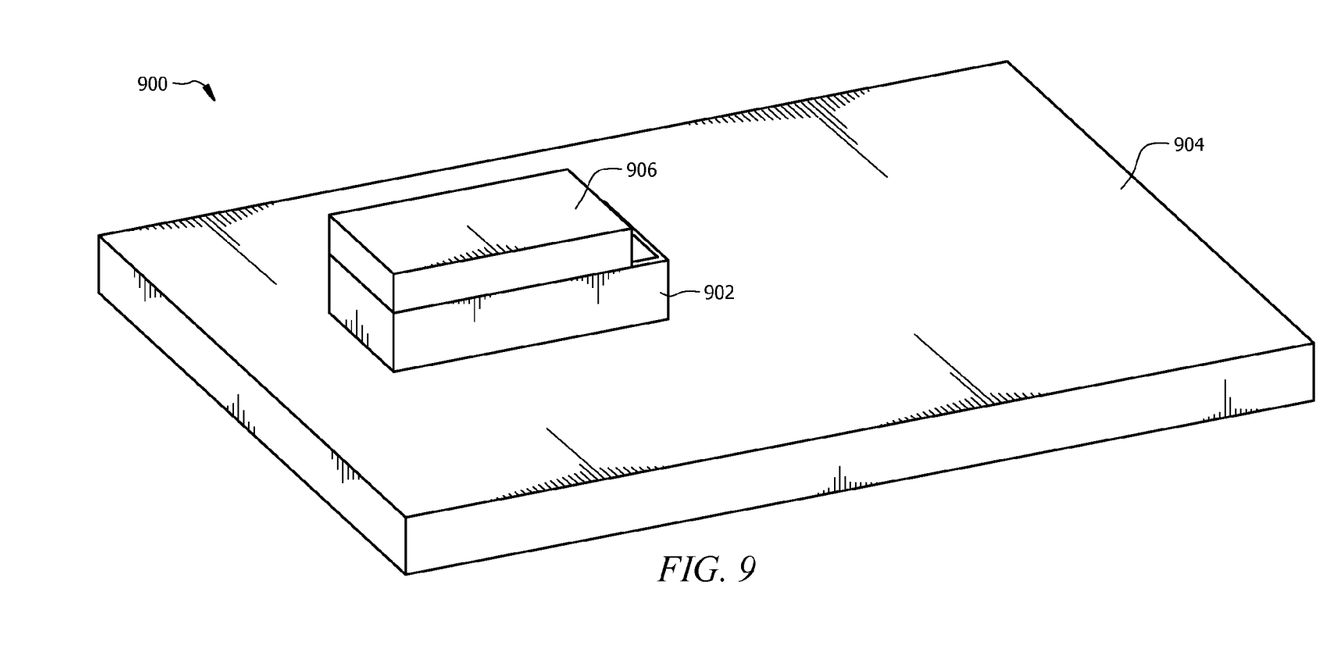
FIG. 9 is a perspective view of another embodiment of an optical system that comprises a silicon photonic device integrated with a silicon chip.

FIG. 9 is a perspective view of another embodiment of an optical system 900 that comprises a silicon photonic device 902 integrated with a silicon chip 904. In contrast to optical system 800 described in FIG. 8, optical system 900 can be employed for applications that require a lid 906 (e.g., lid 514 described in FIG. 5 or lid 614 described in FIG. 6) for the silicon photonic device 902, for example, when the silicon photonic device 902 is not located within a hermetic package. Silicon photonic device 902 may be configured similarly to silicon photonic device 500 described in FIG. 5 or silicon photonic device 600 described in FIG. 6.

Silicon chip 904 is a silicon substrate that comprises one or more grating ports or waveguides. Silicon photonic device 902 is bonded to silicon chip 904 using an epoxy or any other suitable bonding technique as would be appreciated by one of ordinary skill in the art upon viewing this disclosure. Silicon photonic device 902 is aligned with silicon chip 904 such that at least a portion of light can be communicated from the silicon photonic device 902 to one or more grating ports or waveguides on silicon chip 904.

Figure 10:
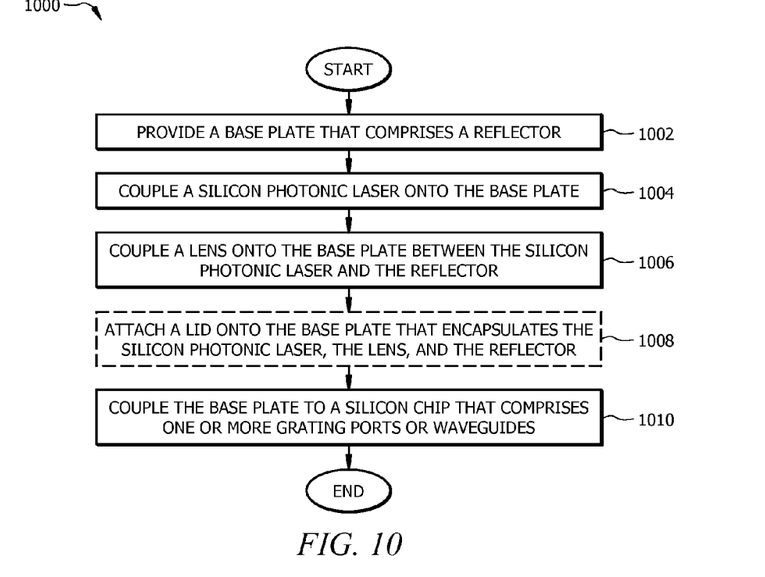
FIG. 10 is a flowchart of an embodiment of a silicon photonic device manufacturing method for a silicon photonic device.

FIG. 10 is a flowchart of an embodiment of a silicon photonic device manufacturing method 1000 for a silicon photonic device. The silicon photonic device may be configured similarly to silicon photonic device 100 described in FIG. 1, silicon photonic device 200 described in FIG. 2, silicon photonic device 300 described in FIG. 3, silicon photonic device 500 described in FIG. 5, or silicon photonic device 600 described in FIG. 6. Silicon photonic device manufacturing method 1000 can be implemented to produce a silicon photonic device that allows a horizontally mounted photonic laser to communicate light to a grating port or a waveguide on a silicon chip.

At step 1002, a base plate that comprises a reflector is provided. For example, a silicon substrate is provided as a base plate and a reflector is monolithically formed onto the base plate using wet etching or dry etching. The reflector comprises one or more angled internal surfaces and is configured to receive light from a light source (e.g., a photonic laser) and to reflect or steer at least a portion of the light through the base plate and towards a grating port or waveguide in a silicon chip via total internal reflection within the reflector. The base plate and reflector may be configured similarly to base plate 102 and reflector 108 described in FIG. 1.

At step 1004, a photonic laser is coupled to the base plate using a laser mount similarly to laser mount 106 described in FIG. 1. The photonic laser is electrically coupled to one or more bonding pads that are configured to communicate electrical power or control signals to the photonic laser. Bonding pads may be configured similarly to bonding pads 112 described in FIG. 1.

At step 1006, a lens is coupled onto the base plate between the photonic laser and the reflector. The lens may be configured similarly to lens 110 described in FIG. 1. The lens is coupled to the base plate using a slot that is etched into the base plate and/or an epoxy (e.g., UV adhesive). The lens is configured to receive light from the photonic laser and to pass a focused light to the reflector. Optionally, an optical isolator can be coupled to the base plate between the lens and the reflector. Optical isolator is configured similarly to optical isolator 214 described in FIG. 2. The optical isolator is coupled to the base plate using a slot that is etched into the base plate and/or an epoxy (e.g., UV adhesive). The optical isolator is configured to prevent light from reflecting back into the photonic laser.

Optionally at step 1008, a lid is attached to the base plate such that the lid encapsulates the photonic laser, the lens, and the reflector. The lid may be configured similarly to lid 514 described in FIG. 5 or lid 614 described in FIG. 6. The lid is bonded to the base plate to hermetically seal the photonic laser, the lens, and the reflector.

At step 1010, the base plate is coupled to a silicon chip. The base is aligned and configured such that light can be communicated from the base plate (e.g., the photonic laser) to a grating port or a waveguide on the silicon plate.

Figure 11:
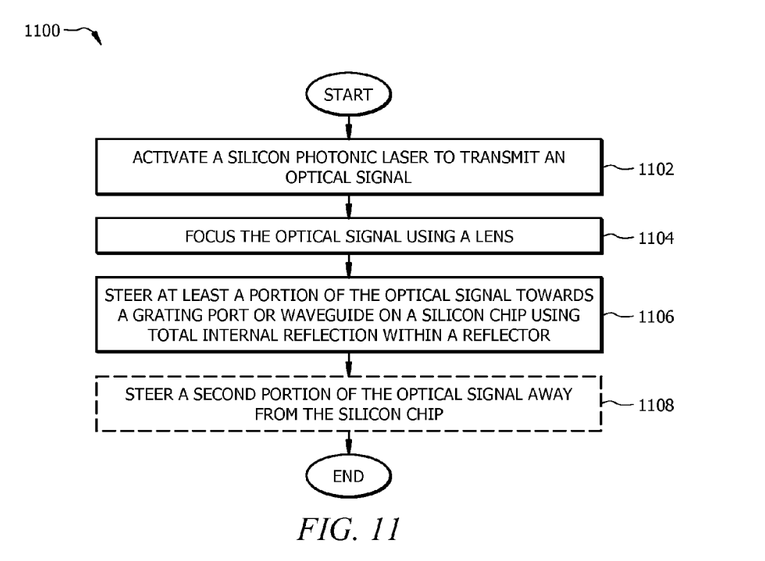
FIG. 11 is a flowchart of another embodiment of a light steering method for a silicon photonic device.

FIG. 11 is a flowchart of another embodiment of a light steering method 1100 for a silicon photonic device. A silicon photonic device may be configured similarly to silicon photonic device 100 described in FIG. 1, silicon photonic device 200 described in FIG. 2, silicon photonic device 300 described in FIG. 3, silicon photonic device 500 described in FIG. 5, or silicon photonic device 600 described in FIG. 6. A light steering method 1100 can be implemented to generate and steer light from a silicon photonic device that comprises a horizontally mounted photonic laser to a grating port or a waveguide on a silicon chip.

At step 1102, an electrical signal is provided to activate a photonic laser to generate and transmit light. For example, an electrical signal is applied to one or more bonding pads to activate the photonic laser. At step 1104, a lens receives the light from the photonic laser and focuses the light. The lens passes the light towards a reflector. At step 1106, at least portion of the light enters the reflector and is steered towards a grating port or a waveguide on a silicon chip using total internal reflection within the reflector.

Optionally at step 1108, a second portion of the light is steered away from the silicon chip when a lid is not present on the silicon photonic device. For example, the reflector comprises a semi-reflective coating (e.g., AR coating) which reflects a second portion of the light away from the silicon chip, for example, for testing.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A photonic device comprising:
a base plate;
a photonic laser coupled to the base plate and configured to generate a light;
a lens coupled to the base plate and configured to:
receive the light from the photonic laser,
form a focused light, and
pass the focused light to a reflector; and
the reflector incorporated with the base plate such that the lens is positioned between the photonic laser and the reflector, wherein the reflector is configured to:
receive the focused light, and
steer a first portion of the focused light through the base plate using total internal reflection.

2. The device of claim 1, wherein the reflector is configured to reflect a second portion of the focused light away from the base plate.

3. The device of claim 1, wherein the base plate comprises a silicon substrate, and wherein the reflector is incorporated with the base plate using monolithic wet etching on the silicon substrate.

4. The device of claim 1, wherein the reflector is incorporated with the base plate using a bonding interface between the reflector and the base plate.

5. The device of claim 1, wherein the base plate is not coupled to a lid configured to encapsulate the photonic laser, the lens, and the reflector.

6. The device of claim 1, further comprising a lid configured to encapsulate the photonic laser, the lens, and the reflector, and wherein the lid does not reflect the light though the base plate.

7. The device of claim 1, further comprising an optical isolator coupled to the base plate and positioned between the lens and the reflector, wherein the optical isolator is configured to substantially disallow the focused light to reflect towards the photonic laser.

8. The device of claim 1, further comprising one or more bonding pads electrically coupled to the photonic laser, wherein the bonding pads are configured to communicate an electrical signal to the photonic laser to generate the light.

9. The device of claim 1, wherein the reflector comprises silicon, and wherein an angle for steering the first portion of the focused light is determined by a crystalline lattice structure of the silicon.

* * * * *